(12) United States Patent
Sevindik et al.

(10) Patent No.: US 11,589,364 B2
(45) Date of Patent: Feb. 21, 2023

(54) COMMUNICATION SYSTEM MANAGEMENT AND PERFORMANCE REPORTING

(71) Applicant: Charter Communications Operating, LLC, St. Louis, MO (US)

(72) Inventors: Volkan Sevindik, Reston, VA (US); Haider H. Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 110 days.

(21) Appl. No.: 17/159,296

(22) Filed: Jan. 27, 2021

(65) Prior Publication Data
US 2022/0240259 A1 Jul. 28, 2022

(51) Int. Cl.
*H04W 72/08* (2009.01)
*H04W 16/14* (2009.01)
*H04L 5/00* (2006.01)

(52) U.S. Cl.
CPC ......... *H04W 72/082* (2013.01); *H04L 5/0073* (2013.01); *H04W 16/14* (2013.01)

(58) Field of Classification Search
CPC ........... H04W 72/08–087; H04W 72/12–1294; H04W 16/10–18; H04L 5/0071–0078
See application file for complete search history.

(56) References Cited

U.S. PATENT DOCUMENTS

| | | | | |
|---|---|---|---|---|
| 10,383,129 | B2* | 8/2019 | Martin | H04W 76/14 |
| 2015/0171944 | A1* | 6/2015 | Kalhan | H04L 25/03904 |
| | | | | 370/329 |
| 2015/0257184 | A1* | 9/2015 | Yamazaki | H04W 76/14 |
| | | | | 370/329 |
| 2017/0026939 | A1* | 1/2017 | Fodor | H04W 72/0406 |
| 2017/0034834 | A1* | 2/2017 | Folke | H04W 76/14 |
| 2017/0331670 | A1* | 11/2017 | Parkvall | H04B 7/0695 |
| 2019/0104489 | A1* | 4/2019 | Huang | H04W 16/14 |
| 2020/0229206 | A1* | 7/2020 | Badic | H04W 16/32 |
| 2021/0297128 | A1* | 9/2021 | Badic | H04W 72/0406 |
| 2021/0314796 | A1* | 10/2021 | Hoang | H04W 52/36 |

* cited by examiner

*Primary Examiner* — Chi H Pham
*Assistant Examiner* — Vladislav Y Agureyev
(74) *Attorney, Agent, or Firm* — Armis IP Law, LLC

(57) ABSTRACT

A communication management resource detects or anticipates occurrence of wireless interference on a wireless channel allocated to a wireless base station to communicate with multiple communication devices. In response to the detected wireless interference, the communication management resource determines a group of the multiple communication devices receiving data of a particular type from the wireless base station. To reduce the wireless interference, the wireless base station notifies the communication devices in the group to operate in a device-to-device communication mode as an alternative path of conveying the particular type of data to the group of communication devices. Thus, during times of wireless interference, instead of communicating a message to each of the wireless communication device in the group, the wireless base station communicates a wireless communication to a first communication device in the group; the first communication device forwards the communication to a second communication device in the group.

34 Claims, 10 Drawing Sheets

COMMUNICATION SYSTEM MANAGEMENT AND PERFORMANCE REPORTING

BACKGROUND

Conventional wireless networks typically include one or more wireless base stations to provide mobile communication devices access to a remote network such as the Internet. One type of wireless base station is a so-called CBSD (Citizen Broadband Radio Service Device). Such a device uses one or more wireless channels allocated from a CBRS (Citizens Band Radio Service) band to support communications with one or more mobile communication devices.

Each base station in a network environment can be configured to communicate with the SAS to receive notification of the one or more wireless channels allocated for its use. Controlled allocation of wireless channels by the spectrum access system helps to prevent wireless interference.

There are multiple different types of wireless channels in a conventional CBRS band. For example, portions of bandwidth in a CBRS band include so-called Priority Access License (PAL) wireless channels, General Authorized Access (GAA) wireless channels, or a combination of both.

In general, PAL wireless channels are licensed wireless channels in which a corresponding licensee (such as an entity paying for use of the wireless channel) is provided some protection of use over lower priority users. For example, when no incumbent user requires use of the channels, the licenses entity is able to freely use the PAL wireless channels in respective one or more predetermined geographical regions without interference by other users (such as lower priority GAA users).

Subsequent to allocation as previously discussed, the wireless base station then uses the allocated bandwidth (such as one or more wireless channels) to provide the one or more communication devices access to a remote network such as the Internet.

BRIEF DESCRIPTION OF EMBODIMENTS

Embodiments herein provide novel ways of providing improved wireless communications to one or more mobile communication devices in a network environment.

More specifically, a network environment includes a communication management resource. The communication management resource detects occurrence of wireless interference on a wireless channel allocated to a wireless base station to communicate with multiple communication devices. In response to the detected wireless interference, the communication management resource determines a group of the multiple communication devices receiving data of a particular type from the wireless base station. To reduce the wireless interference, the wireless base station notifies the communication devices in the group to at least temporarily operate in a device-to-device communication mode as an alternative way of conveying the particular type of data to the group of communication devices.

Thus, during times of wireless interference, instead of communicating an individual message to each of the wireless communication devices in the group, which uses a large amount of wireless bandwidth, the wireless base station communicates a wireless communication to a first communication device in the group; the first communication device forwards (a copy of) the communication to a second communication device in the group. Eventually, via the device-to-device communications mode (such as supporting conveyance from one communication device to another), each of the communication devices receives the message. The conveyance of communications via device-to-device connectivity reduce wireless interference associated with the wireless base station.

Further embodiments herein include, via the communication management resource, producing connection control information defining interconnectivity of the multiple communication devices. The interconnectivity represents an alternative way of conveying the particular type of data. For example, during times when there is no wireless interference, the wireless base station is able to communicate data to each of the communication devices. Alternatively, the interconnectivity as indicated by the connection control information provides a way to communicate one or more messages to each of the communication devices via an alternative to the direct path between the wireless base station and the communication devices. To implement the alternative communication path mode, the wireless base station communicates the connection control information to each of the communication devices in the group.

In further example embodiments, via the connection control information, the communication management resource designates a first communication device in the group to receive communications from the wireless base station. As previously discussed, the first communication device conveys the communications downstream to one or more other communication devices in the group.

In one embodiment, in addition to the connection control information, the wireless base station (or other suitable entity) communicates timing information indicating, for example, when and potentially a time duration in which to implement the connection control information. Such timing information controls a timing of implementing the alternative device-to-device communications.

In further example embodiments, the detected occurrence resulting in generation and/or distribution of the connection control information is a first instance of wireless interference. In response to detecting a second instance of the wireless interference, and to reduce wireless interference, the wireless base station notifies the communication devices in the group (such as communication devices that receives a particular type of message or copy of the same broadcast data) to implement the interconnectivity of the multiple communication devices as indicated by the connect information (e.g., device-to-device mode again).

In one embodiment, the wireless base station communicates with an allocation management resource to register the wireless base station to use one or more wireless channels. For example, embodiments herein include registering the wireless base station with a communication management resource such as a spectrum access system. The wireless base station receives allocation of the wireless channel from the communication management resource.

Even after initial allocation, the allocation management resource controls use of the allocated wireless channel. If wireless interference is detected, the allocation management resource notifies the wireless base station to discontinue use of the wireless channel. The wireless base station notifies a respective gateway of the need to discontinue use (or power down) of using the wireless channel. The gateway monitors communications transmitted to the multiple communication devices through the wireless base station. Based on the monitoring, the gateway tracks and detects the different types of data received by each of the communication devices.

In one embodiment, the gateway detects that each of the communication devices in the group receives the data of the particular type (such as broadcast or other type of data received by each of the communication devices). In a manner as previously discussed, the gateway notifies the wireless base station to implement a device-to-device mode in which the wireless base station communicates a message (such as data of the particular type) to a first communication device that, in turn, communicates the message to one or more other communication devices via device-to-device communications.

In yet further example embodiments, the gateway or other suitable resource keeps track of times in which data of the particular type is communicated to each of the communication devices in the group. For example, in one embodiment, the gateway determines who is in the group based on prior detecting communication of the particular type of data to the communication devices. The gateway communication management resource potentially tracks the timeframe in which the particular type of data is communicated to the communication devices in the group. In one embodiment, if the gateway detects the same data communicated to multiple different communication devices at around the same time, the data is likely broadcast data communicated to each of the communication devices.

In further example embodiments, the allocation management resource is a so-called spectrum access system that allocates the wireless channel from a CBRS (Citizens Band Radio Service) bandwidth.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to provide efficient use of wireless resources in a network environment. The instructions, when executed by computer processor hardware, cause the computer processor hardware (such as one or more co-located or disparately processor devices or hardware) to: detect occurrence of wireless interference on a wireless channel allocated to a wireless base station to communicate with multiple communication devices; in response to the detected wireless interference, determine a group of the multiple communication devices receiving data of a particular type from the wireless base station; and notify the communication devices in the group to operate in a device to device communication mode as an alternative path of conveying the particular type of data to the group of communication devices.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
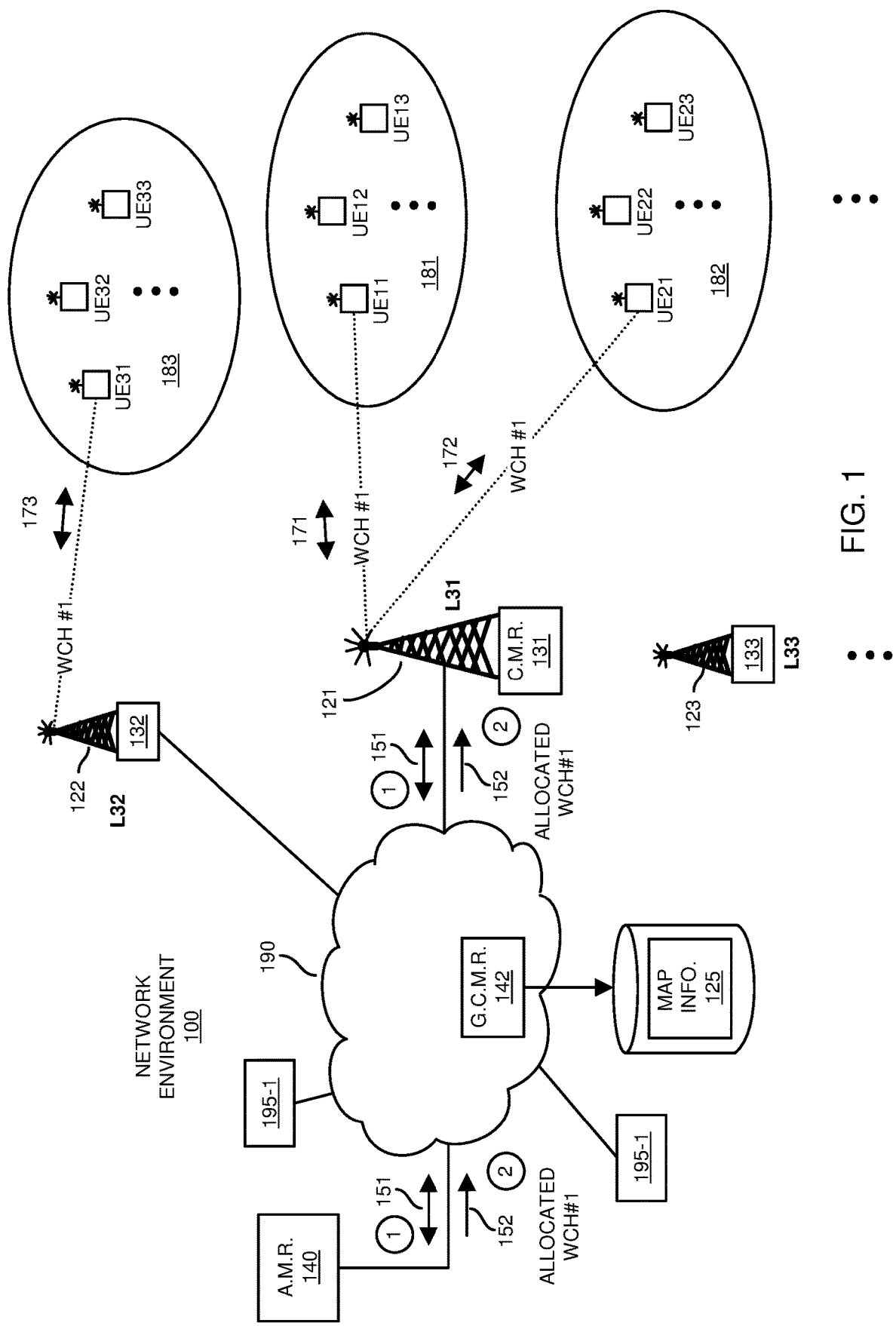
FIG. 1 is an example diagram illustrating a communication system and use of allocated one or more wireless channels according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A communication management resource detects occurrence of wireless interference over one or more wireless channels allocated to a wireless base station to communicate with multiple communication devices. In response to the detected wireless interference, the communication management resource determines a group of the multiple communication devices receiving data of a particular type from the wireless base station. To reduce wireless interference, the wireless base station notifies one or more communication devices in the group to operate in a device-to-device communication mode as an alternative technique of conveying data to the group of communication devices. Thus, during times of wireless interference, instead of individually communicating a message from a wireless base station over a respective wireless communication link to each of the wireless communication device in the group, the wireless base station communicates a wireless message (data) to a first communication device in the group; via device-to-device communications, the first communication device forwards the communication (data) to one or more other communication devices in the group. In one embodiment, the wireless base station communicates configuration information controlling operation of the multiple communication devices in the temporary device-to-device communication mode.

Now, more specifically, with reference to the drawings, FIG. 1 is an example diagram illustrating a communication network environment and allocation of wireless channels according to embodiments herein.

As shown, network environment 100 includes bandwidth allocation management resource 140, network 190 (such as including the Internet, wireless network infrastructure, etc.), and multiple wireless base stations including wireless base station 121 at location L31, wireless base station 122 at location L32, wireless base station 123 at location L33, etc.

As further shown, the network environment 100 includes multiple sets of communication devices. A first set 181 of communication devices includes communication device UE11, communication device UE12, communication device UE13, etc. A second set 182 of communication devices include communication device UE21, communication device UE22, communication device UE23, etc. A third set 183 of communication devices include communication device UE31, communication device UE32, communication device UE33, etc., and so on.

Network environment 100 further includes server resources 195-1, server resource 195-2, etc. In one embodiment, the server resources 195 distribute requested data to each of the communication devices via respective communication paths through the network 190 and wireless base station to the communication devices.

Each of the communication devices is mobile or stationary with respect to the wireless base stations.

Further in this example embodiment, the wireless base station 121 provides the first set 181 of communication devices wireless connectivity to network 190 and server resources via a wireless channel WCH1; the wireless base station 121 provides the second set 182 of communication devices wireless access to network 190 and server resources via a wireless channel WCH1; the wireless base station 122 provides the third set 183 of communication devices communication devices wireless access to network 190 and server resources via a wireless channel WCH1; and so on.

In a first mode, when no wireless interference is detected, the wireless base station 121 communicates with each of the communication devices via a respective wireless communication link via wireless channel WCH1. For example, as shown, in the first mode, the wireless base station 121 communicates over a first wireless communication link to the communication device UE11; the wireless base station 121 communicates over a second wireless communication link to the communication device UE12; the wireless base station 121 communicates over a third wireless communication link to the communication device UE13; and so on.

Additionally, in the first mode, the wireless base station 121 communicates over a fourth wireless communication link to the communication device UE21; the wireless base station 121 communicates over a fifth wireless communication link to the communication device UE22; the wireless base station 121 communicates over a sixth wireless communication link to the communication device UE23; and so on.

In one embodiment, the wireless base station 121, wireless base station 122, wireless base station 123, etc., operate in fairly close proximity to each other. In such an instance, the use of wireless channel WCH1 is subject to wireless interference.

The communication devices (such as different instances of user equipment) in network environment 100 can be of any type. For example, the communication devices can include one or more mobile communication devices, wireless stations, etc., operated by respective users (such as subscribers that pay a fee to use wireless services provided by the wireless base station 121).

Further in this example embodiment, each wireless base station in network environment 100 has a corresponding communication management resource that manages communications with respective communication devices in the network environment 100.

For example, communication management resource 131 manages operation of wireless base station 121 and communications with communication devices UE11, UE12, UE13, etc. Communication management resource 132 manages operation of wireless base station 122 and communication with communication devices UE31, UE32, UE33, etc. Communication management resource 133 manages operation of wireless base station 123 and communications with respective communication devices.

Note that each of the resources in network environment 100 can be configured to include or be configured as appropriate hardware, software, or combination of hardware and software to carry out respective operations as discussed herein.

More specifically, the communication management resource 131 associated with wireless base station 121 as described herein can be implemented via respective communication management hardware, communication management software, or a combination of both.

The communication management resource 132 associated with wireless base station 122 as described herein can be implemented via respective communication management hardware, communication management software, or a combination of both.

The allocation management resource 140 as described herein can be implemented via respective allocation management hardware, allocation management software, or a combination of both.

The gateway communication management resource 142 associated with the network 190 can be implemented via gateway communication management hardware, gateway communication management software, or a combination of both.

Note further that embodiments herein are applicable to any suitable type of wireless communication system. For example, the communication links between the wireless base station and respective communication devices can be configured to support communications in accordance with any suitable type of wireless communication protocol such as 4G, 5G, LTE (Long Term Evolution), NR, etc.

In further example embodiments, the wireless base station 121 (such as a CBSD or Citizens Broadband Radio Service Device, general wireless station, etc.) supports wireless communications with the respective communication devices UE11, UE12, . . . , UE21, UE22, etc., via any suitable wireless communication protocol.

Figure 2:
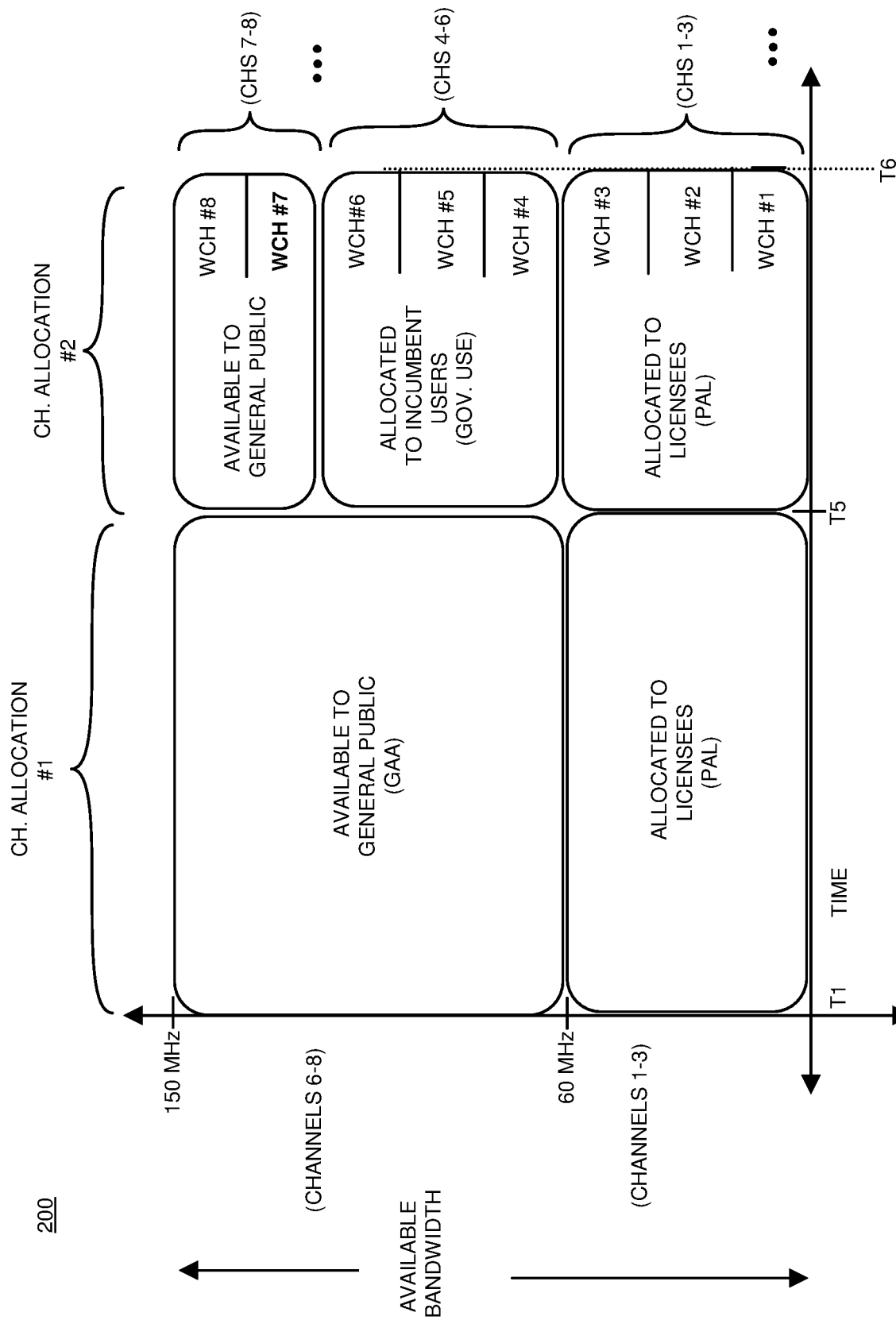
FIG. 2 is an example diagram illustrating allocation of CBRS bandwidth to support communications in a network environment according to embodiments herein.

In one embodiment, the wireless base station 121 implements use of a CBRS (Citizens Band Radio Service) wireless bandwidth and corresponding suitable communication protocol. An example of CBRS bandwidth is shown in FIG. 2.

Referring again to FIG. 1, prior to providing wireless connectivity, during operation #1, via communications 151, the communication management resource 131 of wireless base station 121 registers and communicates with the allocation management resource 140 (such as spectrum access system) over network 190 (such as including the Internet or other communication networks) for allocation of one or more wireless channels to communicate in the network environment 100.

In response to the registration and corresponding request for allocation of bandwidth, the allocation management resource 140 transmits communications 152 to the communication management resource 131. In one embodiment, the communications 152 generated and transmitted by the allocation management resource 140 indicate that the wireless bandwidth WCH1 (such as 20 MHz of wireless bandwidth or other bandwidth amount) has been allocated for use by the wireless base station 121 to communicate with one or more communication devices in network environment 100.

As previously discussed, the wireless bandwidth WCH1 can be allocated from any suitable wireless band. That is, the wireless bandwidth WCH1 can be allocated from a CBRS band or any other wireless spectrum.

Also, as previously discussed, and as further shown, the network environment 100 includes multiple wireless base stations that potentially use the same bandwidth WCH1 to communicate with a respective communication devices. In such an instance, use of the allocated bandwidth WCH1 is susceptible to wireless interference.

In one embodiment, if wireless interference is detected in bandwidth WCH1 during simultaneous use by multiple wireless base station and/or communication devices, the allocation management resource 140 may revoke use of the allocated wireless channel WCH1 to reduce the wireless interference and/or protect a wireless base station and corresponding communication devices from interference. In other words, a wireless network service provider operating the wireless base station 122 may have a license to use wireless channel WCH1 and has higher priority rights than the wireless base station 121 that may be operated by an unlicensed wireless network service provider.

This disclosure includes the observation that revocation of bandwidth WCH1 by the allocation management resource 140 is undesirable.

To avoid revocation of the wireless bandwidth WCH1 from wireless base station 121, embodiments herein include being proactive about detecting occurrence of wireless interference associated with the allocated bandwidth WCH1 and then implementing a respective solution to reduce the occurrence of wireless interference associated with the use of allocated bandwidth WCH1. Via embodiments herein, the reduction in wireless interference associated with use of allocated bandwidth WCH1 as discussed herein alleviates the need for the allocation management resource 140 to deallocate use of bandwidth WCH1.

As discussed in FIG. 2, the allocation management resource 140 can be configured to allocate the bandwidth WCH1 from a CBRS band or other. In such an instance, because embodiments herein reduce wireless interference, implementing interference reduction techniques as discussed herein reduces the likelihood that the allocation management resource 140 will need to revoke allocation of corresponding CBRS bandwidth such as wireless channel WCH1 from the wireless base station 121.

As further discussed herein in the following drawings, one or more entities in the network environment 100 can be configured to monitor for occurrence of wireless interference using wireless channel WCH1. Additionally, or alternatively, the one or more entities as discussed herein can be configured to analyze current operating conditions and anticipate when wireless interference using wireless channel WCH1 will occur. In either instance, embodiments herein include being proactive about adjusting use of the wireless channel WCH1 to avoid wireless interference amongst the wireless stations in network environment 100.

FIG. 2 is an example diagram illustrating allocation of CBRS bandwidth to support communications in a network environment according to embodiments herein.

It is known that a CBRS network (or any wireless network) is an interference limited network, which means the amount of interference in the network environment 100 will determine service quality delivered to respective communication devices (such as wireless subscribers). In a CBRS network, a spectrum access system (SAS) such as allocation management resource 140 manages the interference in network environment 100 (to be below a threshold value for each allocated channel) via careful allocation of wireless channels.

In one embodiment, the allocation management resource 140 controls use of the allocated wireless channel WCH1 depending on detected or expected wireless interference.

For example, if wireless interference is detected or anticipated, the allocation management resource notifies the wireless base station 131 to adjust (such as discontinue) use of the wireless base station 121 using the wireless channel WCH1 to communicate with the respective communication devices UE11, UE12, etc.

As previously discussed, there are two spectrum classifications in CBRS: one classification type is Priority Access License (PAL) users, and the second classification type is General Availability Access (GAA). PAL is a licensed part of the CBRS spectrum, and GAA is free to anyone that wants to operate in the CBRS band with a spectrum grant permission from the allocation management resource 140. If channels are free, the spectrum access system (such as allocation management resource 140) allocates wireless channels to different GAA users.

In certain instances, a portion of wireless channels reserved for use by licensed users may be temporarily allocated for use by unlicensed GAA users if they are available. If a need arises to allocate the wireless channels to a licensed wireless entity, the wireless channel can be revoked from the unlicensed entity and allocated for use by the licensed entity.

In one embodiment, the wireless bandwidth such as one or more wireless channels (WCH1, WCH2, etc.) allocated to the wireless base station 121 can be revoked (de-allocated from the wireless base station 121) in response to the allocation management resource 140 detecting a condition such as that an incumbent user having a higher priority than the wireless base station 121 needs to use or starts to use such wireless channels. Revocation of bandwidth can include communicating a revocation message from the allocation management resource 140 to the communication management resource 131 of wireless base station 121 to revoke a respective wireless channel WCH1 in case the wireless channel is used by the incumbent user.

Thus, in one embodiment, the wireless base station 121 and communication management resource 131 provides wireless connectivity via CBRS or other suitable wireless communication protocol to the multiple mobile communication devices in the network environment 100. The allocation management resource 140 can be configured to revoke use of the allocated wireless bandwidth BW1 in response to detecting use allocation of the bandwidth BW1 to the incumbent user (higher priority user).

Note further that there are also so-called hybrid wireless base station operators that implement use of both PAL and GAA wireless bandwidth to communicate with respective communication devices. In GAA, the CBRS band includes 60-100 MHz of spectrum available that can be granted to any wireless operator as a general user. In certain instances, the allocation management resource 140 allocates the CBRS spectrum in 10 MHz spectrum chunks (or other suitable partitions). Therefore, every 10 MHz bandwidth portion experiences a different level of interference depending on whether the same 10 MHz is being used by another wireless base station in its vicinity.

In one non-limiting example embodiment, the allocation management resource 140 allocates bandwidth from a so-called CBRS (Citizens Band Radio System) band operating between 3.550 and 3.700 GHz (GigaHertz) (such as 150 MegaHertz or 15 wireless channels that are each 10 MHz wide or other sized bandwidth portions, or 8 channels approximately 20 MHz each).

In accordance with further embodiments, the allocation management resource 140 (such as spectrum access system, allocation management resource, or other suitable entity) keeps track, at any given time, which wireless channels or portions of the multi-tier wireless spectrum or multi-tier radio band (such as CBRS band) are available in the geographical region in which the network environment 100 resides. If government use (a so-called incumbent user) is detected or requested via appropriate input (such as shown around time T5) to the allocation management resource 140, certain channels (such as channels 4, 5, and 6) are no longer available for use as shown in graph 200.

More specifically, in this example, prior to time T5, channels 4-8 are available to the general authorized access users (general public or low priority users) for use; channels 1-3 are available for use by a respective one or more licensee.

As further shown, at or around time T5, assume that the allocation management resource 140 receives input indicating use of a portion (channels 4-6) of the spectrum by an incumbent user such as the government. In such an instance, the allocation management resource 140 updates the channel availability such that only channels 7 and 8 are available to the general authorized access users; channels 4-6 are assigned for use by an incumbent entity requesting use or actually using the channels; wireless channels 1-3 are allocated for use by a licensee. Thus, after time T5, and before time T6, the wireless channels 4-6 are no longer available for use by the lower priority users (i.e., general authorized access users or licensed entities).

In one embodiment, in response to revocation of the allocation of wireless bandwidth (such as one of channels 4-6), assuming that the wireless base station 121 is allocated wireless channel #5, the allocation management resource 140 notifies the wireless base station 131 at or around time T5 that the wireless base station 121 is no longer able to use wireless channel WCH5 because it has been revoked and assigned for use by the incumbent user. In one embodiment, the allocation management resource 140 revokes use of wireless channel WCH1 in response to detecting that the wireless channel WCH1 is no used by the incumbent user.

Thus, in this example embodiment, between time T1 and time T5, the wireless base station 121 uses the wireless bandwidth BW1 (such as wireless channel #5) to provide the respective user equipment connectivity to the remote network 190. At or around time T5, the communication management resource 140 deallocates use of the wireless bandwidth such as wireless channel #5 from the wireless base station 121 in favor of use of the wireless channel by the incumbent user after time T5.

This illustrates the dynamic availability of different wireless bandwidth in a hierarchy as shared in network environment 100. For example, if communication management resource 140 allocates use of one or more wireless channels #4-6 in the hierarchy of available channels to any of base stations, then the allocation management resource 140 must de-allocate use of such wireless channels during conditions in which a higher priority so-called incumbent user relinquishes use of wireless channels 4-6 at or around time T5.

In such an instance, as previously discussed, the communication management resource 140 deallocates the wireless channels 4-6 from respective wireless stations for use instead by the incumbent user (higher priority user). Wireless channels 1-3 may experience use by a respective higher priority entity. In such an instance, the allocation management resource 140 at least temporarily revokes use of the wireless channel WCH1 from the wireless base station 121 such as between time T5 and T6.

Figure 3:
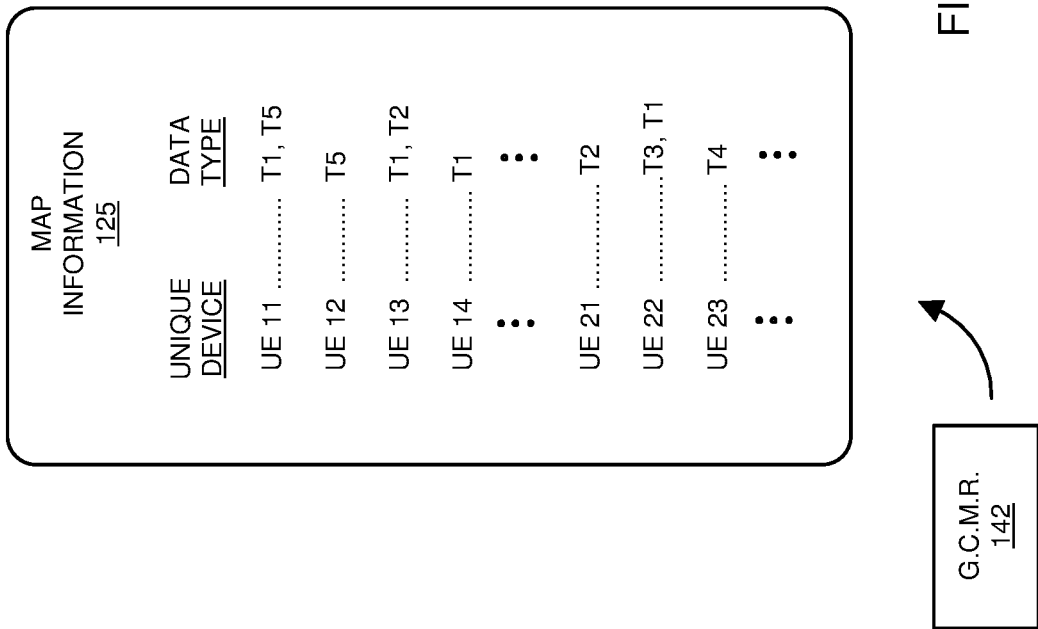
FIG. 3 is an example diagram illustrating generation of map information according to embodiments herein.

FIG. 3 is an example diagram illustrating generation of map information according to embodiments herein.

In yet further example embodiments, the gateway communication management resource 142 or other suitable resource keeps track of data of a particular type and/or times when such data is communicated to each of the communication devices in the group.

More specifically, in one embodiment, the gateway communication management resource 142 monitors data traffic (content) distributed through the network 190 and corresponding wireless base station 121 to the different communication devices in each of groups 181, 182, during non-interference conditions.

In this example embodiment, based on monitoring of retrieved or requested data traffic (digital content) such as during conditions when there is no wireless interference, the gateway communication management resource 142 produces map information 125 indicating the different types of data received/retrieved by the communication devices.

For example, as shown, in one embodiment, during times when no interference is detected using wireless channel WCH1, the gateway communication management resource 142 detects that communication device UE11 receives/retrieves data of type T1 and T5; the gateway communication management resource 142 detects that communication device UE12 receives/retrieves data of type T5; the gateway communication management resource 142 detects that communication device UE13 receives/retrieves data of type T1 and T2; the gateway communication management resource 142 detects that communication device UE14 receives/retrieves data of type T1; . . . ; the gateway communication management resource 142 detects that communication device UE21 receives/retrieves data of type T2; the gateway communication management resource 142 detects that communication device UE22 receives/retrieves data of type T3 and T1; the gateway communication management resource 142 detects that communication device UE23 receives/retrieves data of type T4; and so on.

Again, in one embodiment, the gateway communication management resource 142 produces the map information 125 to track a profile of each of the communication devices and the type of data such devices receive/retrieve.

Note that the data type (such as T1, T2, T3, etc.) can be determined in any suitable manner. For example, in one embodiment, the data type is determined based on a source network address of a communication device (such as one of servers 195-1, 195-2, etc.) that communicate respective data to the communication devices.

Additionally, or alternatively, the type represents attributes of the corresponding data itself that is retrieved or received by each of the communication devices.

As further discussed herein, the gateway communication management resource 142 or other suitable entity can be configured to determine which of the multiple communication devices supported by wireless base station 121 fall into a sub-group that receives or retrieves the same data based on the map information 125.

In further example embodiments, if the gateway communication management resource 142 or other suitable entity in network environment 100 detects the same data (or same type of data) communicated to multiple different communication devices at around the same time, the data is likely broadcast data communicated to each of the communication devices. In such an instance, or in other instances when is known that a sub-group of the communication devices simply receives or retrieves the same data, the wireless base station 121 can be configured to operate in device-to-device operational mode as further discussed herein to reduce wireless interference associated with use of the wireless channel WCH1.

Figure 4:
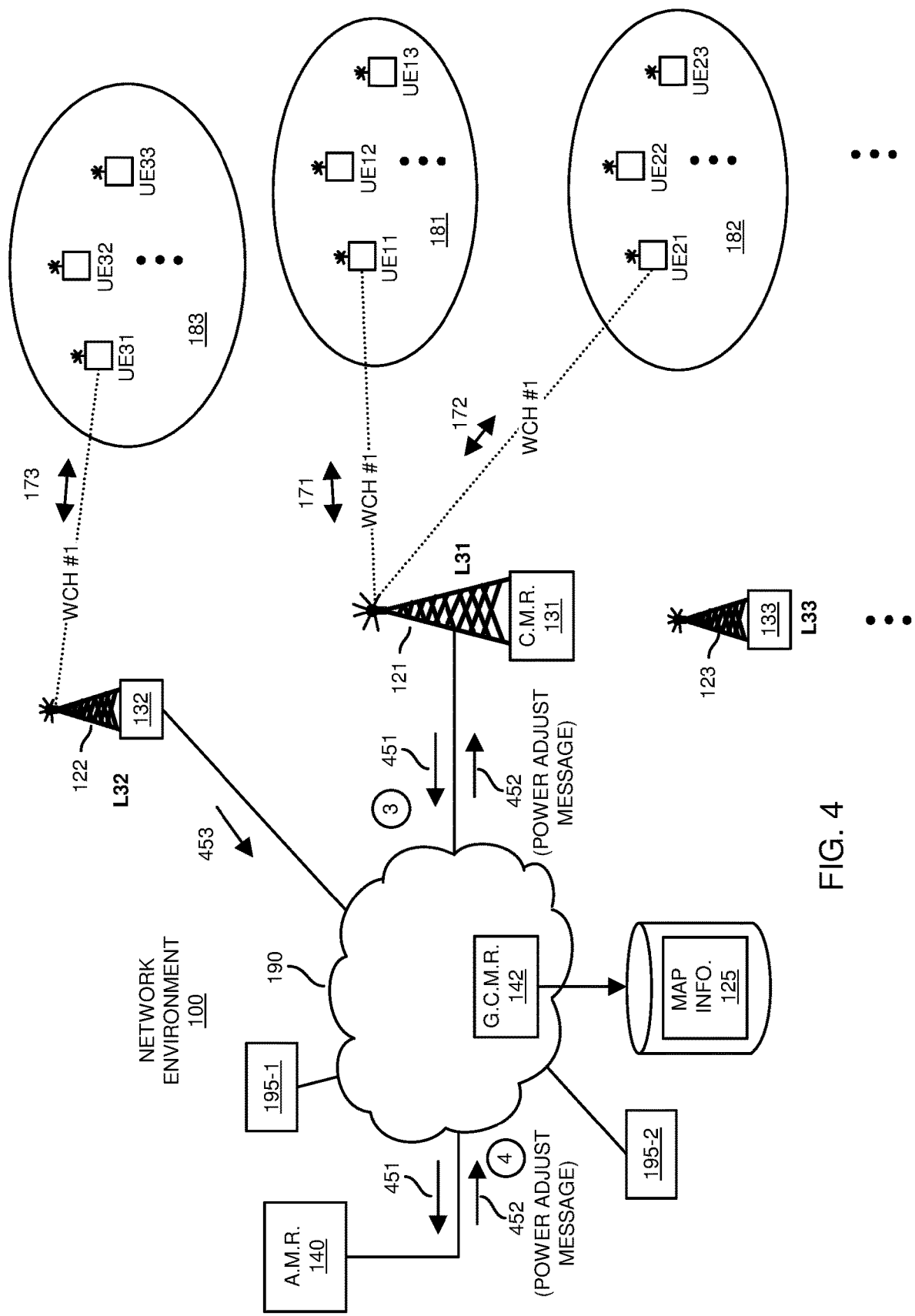
FIG. 4 is an example diagram illustrating communication of a notification to adjust wireless power levels of communicating in a network environment according to embodiments herein.

FIG. 4 is an example diagram illustrating communication of a notification to adjust a power level of wireless communications according to embodiments herein.

As shown in FIG. 4, the wireless station 121 uses wireless channel WCH1 to wirelessly communicate with communication devices UE11, UE12, UE13, etc., UE21, UE22, UE23, etc. The wireless station 122 uses wireless channel WCH1 to wirelessly communicate with communication devices UE31, UE32, UE33, etc.

In such an instance, the wireless channel WCH1 conveys wireless communications 171 between the wireless base station 121 and each of the communication devices UE11, UE12, UE13, etc., wireless channel WCH1 conveys wireless communications 172 between the wireless base station 121 and each of the communication devices UE21, UE22, UE23, etc., wireless channel WCH1 conveys wireless communications 173 between the wireless base station 122 and each of the communication devices UE31, UE32, UE33, etc.

In one nonlimiting example embodiment, the communication management resources 131, 132, etc., continuously monitor attributes associated with communicating in network environment 100 to determine occurrence of wireless interference associated with the wireless channel WCH1.

For example, in one embodiment, the communication management resource 121 keeps track of a power level at which communications 171 are communicated to the communication devices in group 181. The wireless base station 122 receives feedback (such as from respective communication devices) indicating a wireless power level at which each of the communication devices receive the wireless communications 171 from the wireless base station 121. In further example embodiments, the wireless base station tracks a power level at which wireless communications are transmitted from the communication devices. The wireless base station 121 tracks a power level at which the communications are received from the communication devices.

The wireless base station 121 processes the collected information or forwards such information (or other information indicating occurrence of wireless interference) via communications 451 through network 190 to the allocation management resource 142. In one embodiment, the allocation management resource 142 processes the received information regarding wireless power levels to determine occurrence of wireless interference in the network environment 100.

In a similar manner, the wireless base station 122 collects information from the communication devices UE31, UE32, UE33, etc., as well as information regarding receipt of communications from the communication devices and forwards such information to the allocation management resource 140. Via the communications 453, the allocation management resource 140 determines a degree to which the operation of wireless base station 121 and corresponding communications 171 to the communication devices UE11, UE12, . . . UE21, UE22, etc., cause wireless interference to the wireless base station 122 and corresponding communication devices UE31, UE32, UE33, etc.

In response to the detection of the wireless interference such as caused by the wireless base station 121 to the wireless base station 122 (such as a licensed entity afforded protected use of wireless channel WCH1 over wireless base station 121), the allocation management resource 140 (i.e., a communication management resource) communicates a power adjust message 452 to the wireless base station 121.

In one embodiment, the power adjust message 452 notifies the wireless base station 121 to adjust use of using the wireless channel WCH1 to communicate with the respective communication devices UE11, UE12, UE13, etc. As further discussed below, an adjustment implemented by the wireless base station 121 and corresponding communication devices reduces wireless interference caused by the wireless base station 121 and corresponding communication devices using wireless channel WCH1.

Figure 5:
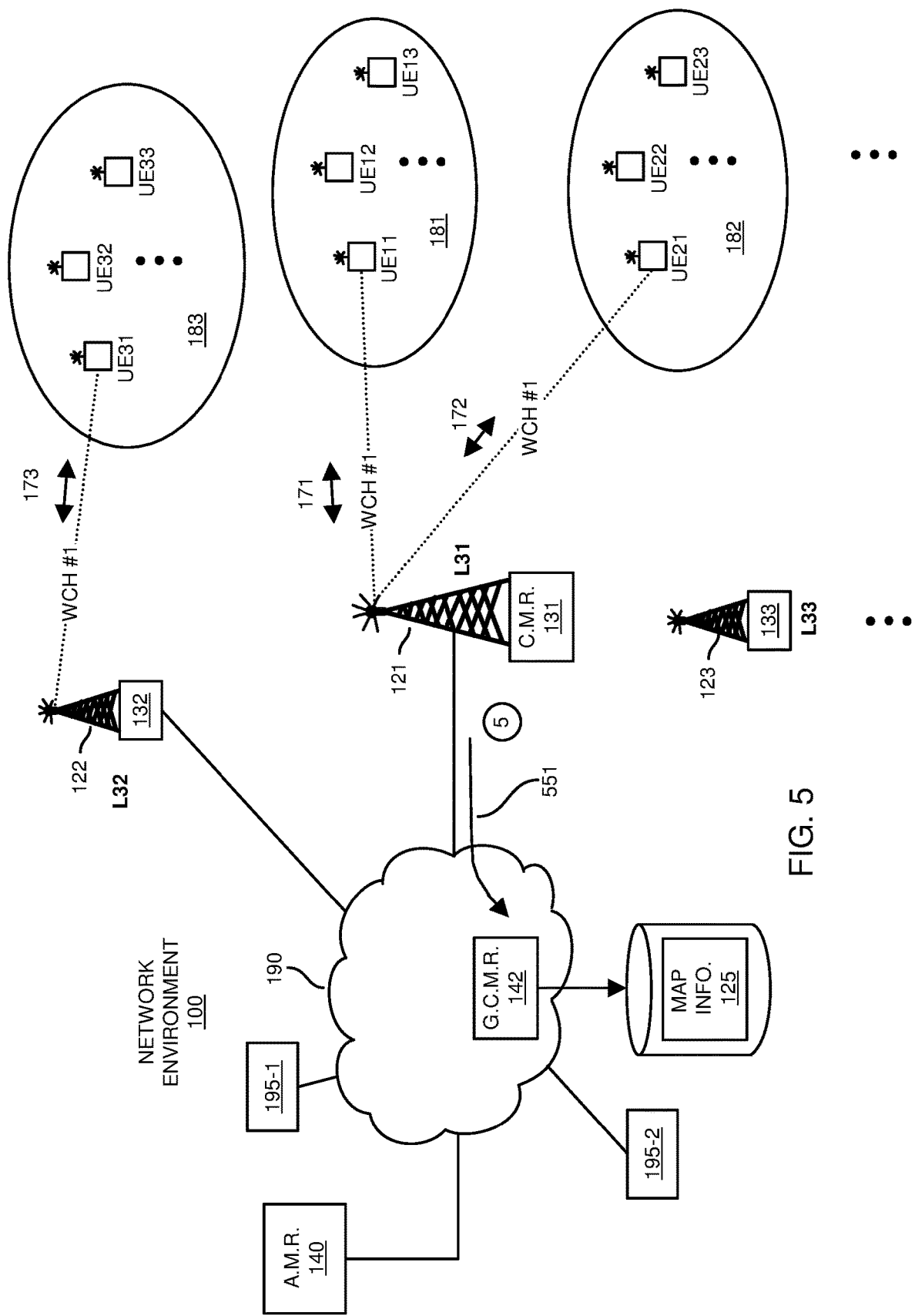
FIG. 5 is an example diagram illustrating communication of a power adjustment notification to a gateway communication management resource according to embodiments herein.

FIG. 5 is an example diagram illustrating communication of a power adjust notification to a gateway communication management resource according to embodiments herein.

In response to receiving the power adjust message 452 to adjust (such as discontinue or reduce the power level of the) use of the wireless channel WCH1, the wireless station 121 transmits a respective communication 551 to the gateway communication management resource 142. Thus, the gateway communication management resource 142 is notified of a respective wireless interference condition in which the wireless base station 121 is no longer able to use or is required to reduce use of the wireless channel WCH1 to communicate with a respective one or more communication devices because such communications cause wireless interference such as to wireless station 122.

Figure 6:
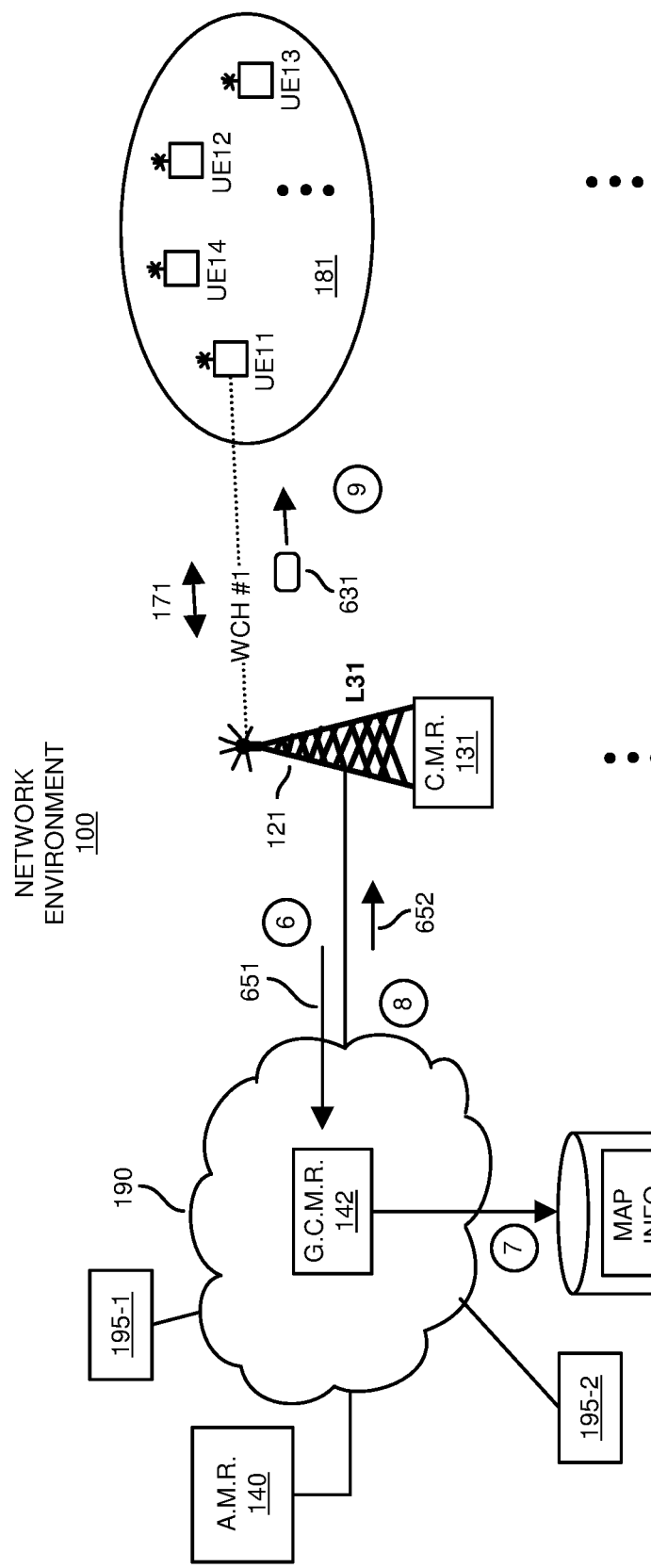
FIG. 6 is an example diagram illustrating detection of a request for content and notification of multiple communication devices that receive requested content according to embodiments herein.

FIG. 6 is an example diagram illustrating detection of a request for content according to embodiments herein.

In this example embodiment, the gateway communication management resource 142 uses the map information 125 as a basis to determine different types of data retrieved by the communication devices UE11, UE12, UE13, etc.

In one embodiment, the gateway communication management resource 140 monitors communications 651 such as one or more requests for particular content communicated through network 190 as originated from the communication devices. Assume in this example embodiment that the gateway communication management resource 142 detects a request for data of type T1 from the communication device UE11.

The gateway communication management resource 142 identifies identities (such as network addresses) of end user communication devices in the network environment 100 that receive data of the type T1. In one embodiment, the gateway communication management resource 142 assigns each of the communication devices a respective unique identifier value (such as network address) to receive wireless communications from the wireless base station 121.

Further in this example embodiment, the gateway communication management resource 140 determines from map information 125 that UE11, UE13, and UE14 typically receive the data of type T1 based on prior history of the communication devices retrieving content over network 190 such as from server resources 195-1, 195-2, etc.

Via communications 652, the gateway communication management resource 142 notifies the wireless base station 121 and corresponding communication management resource 131 of a group of communication devices that typically receive the type 1 data (such as broadcast data or data of other suitable type) as learned from the map information 125 indicating communication devices that typically receive data of type T1 (such as stream of video content or other information).

The wireless base station 121 or other suitable entity produces configuration information 631 to operate the group of communication devices UE11, UE13, and UE14 in a device-to-device mode.

Figure 7:
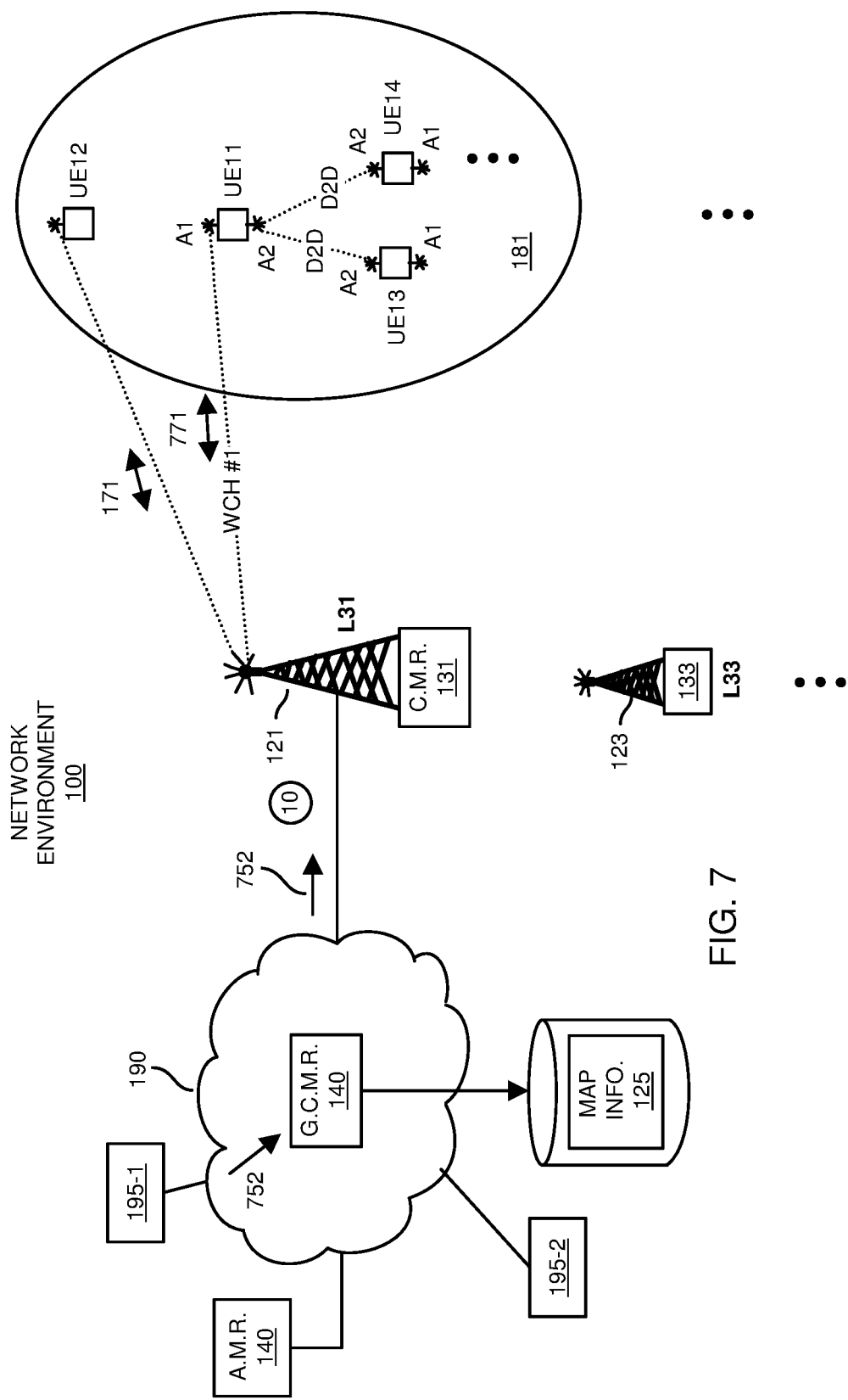
FIG. 7 is an example diagram illustrating operation of multiple communication devices in a device-to-device mode according to embodiments herein.

In one embodiment, the configuration information 631 specifies a limited duration of time in which to operate in the device-to-device mode. Via communications 171, the wireless base station 121 communicates the device-to-device mode configuration information 631 to each of the communication devices UE11, UE13, and UE14. As shown in FIG. 7, the communication devices UE11, UE13, and UE14 implement the received configuration information from the wireless base station 121 and operate in a device-to-device mode. In one embodiment, the wireless base station 121 communicates a first message including the configuration information 631 to the communication device UE11; the wireless base station 121 communicates a second message including the configuration information 631 to the communication device UE21; the wireless base station 121 communicates a first message including the configuration information 631 to the communication device UE31.

Thus, to reduce the occurrence of the detected (or anticipated) wireless interference, the wireless base station 121 notifies the communication devices UE11, UE13, and U14 to at least temporarily operate in a device-to-device communication mode via configuration information 631 as an alternative way of conveying data of the particular type 1 to the sub-group of communication devices.

FIG. 7 is an example diagram illustrating operation of multiple communication devices in a device-to-device mode according to embodiments herein.

Further embodiments herein include, via a communication management resource such as associated with the wireless base station 121 or other suitable entity, producing configuration information 631 (such as connection control information) defining interconnectivity of the multiple communication devices during implementation of a device-to-device mode of operation to reduce interference.

In one embodiment, the interconnectivity defined by the configuration information 631 defines alternative paths of conveying data of a particular type. For example, during times when there is no wireless interference, the wireless base station is able to individually communicate data to each of the communication devices. Alternatively, the interconnectivity as indicated by the connection control information provides a way to communicate one or more messages to each of the communication devices via an alternative to the direct individual paths (communication links) between the wireless base station and the communication devices. To implement the alternative communication mode, the wireless base station communicates the configuration information (connection control information) to one or more of the communication devices in the group as previously discussed.

In one embodiment, the connection control information (configuration information 631) indicates a first communication device in the group of communication devices receiving type 1 communications to receive communications from the wireless base station.

The configuration information can be configured to include timing information indicating, for example, when and potentially a time duration in which to implement operation of the communication devices in the device-to-device as specified by the connection control information.

In one embodiment, the requested content of type T1 is transmitted as communications 752 from the server resource 195-1 through network 190 to the wireless base station 121. The wireless base station 121 communicates the received data of type T1 in communications 752 as communications 771 from the wireless base station 121 to the cd UE11.

Thus, as shown in FIG. 7, during times of detected or anticipated wireless interference, instead of communicating an individual wireless message of type T1 to each of the wireless communication devices UE11, UE13, and UE14 in the subgroup, the wireless base station 121 communicates a wireless communication 771 to communication device UE11 (designated as a root node) in the subgroup; the communication device UE11 forwards a copy of the data in the communication 771 to a communication device UE3 (child node 1) and communication device UE14 (child node 2) in the sub group via wireless channel WCH1. Thus, eventually, via the device-to-device communications (such as from one communication device to another), each of the communication devices receives the data in communication 771 (message). Such conveyance of communications via device-to-device connectivity reduces wireless interference associated with the wireless base station 121.

In one embodiment, the device-to-device communications from communication device UE11 to communication devices UE13 and UE14 occur when the wireless base station 121 is not using the wireless channel WCH1.

In further example embodiments, each time wireless interference is detected, embodiments herein include, operating in the device-to-device mode. For example, in one embodiment, in response to detecting a second instance of the wireless interference, to reduce wireless interference in network environment 100, the wireless base station 121 notifies the communication devices UE11, UE13, and UE13 in the group (such as communication devices that receives a particular type of message or copy of the same broadcast data) to implement the device-to-device interconnectivity of the multiple communication devices to convey received one or more blocks of broadcast data.

Note that the communication devices can be configured to include multiple antennas such as antenna A1 and antenna A2. In one embodiment, the communication device UE11 receives the communication 771 over antenna A1 (via wireless channel WCH1). The communication device UE11 communicates (via wireless channel WCH1) a copy of the received communication 771 over antenna A2 to the antenna A2 of the communication device UE13. The communication device UE11 communicates (via a wireless channel WCH1) a copy of the received communication 771 over antenna A2 to the antenna A2 of the communication device UE14.

In accordance with further example embodiments, the wireless base station 121 can be configured to control a power level of the communication device UE11 communicating the communication 771 to the communication devices UE13 and UE14 such that the wireless base station 122 and corresponding communication devices UE31, UE32, etc., do not experience wireless interference caused by the wireless base station 121 and corresponding communication devices.

Figure 8:
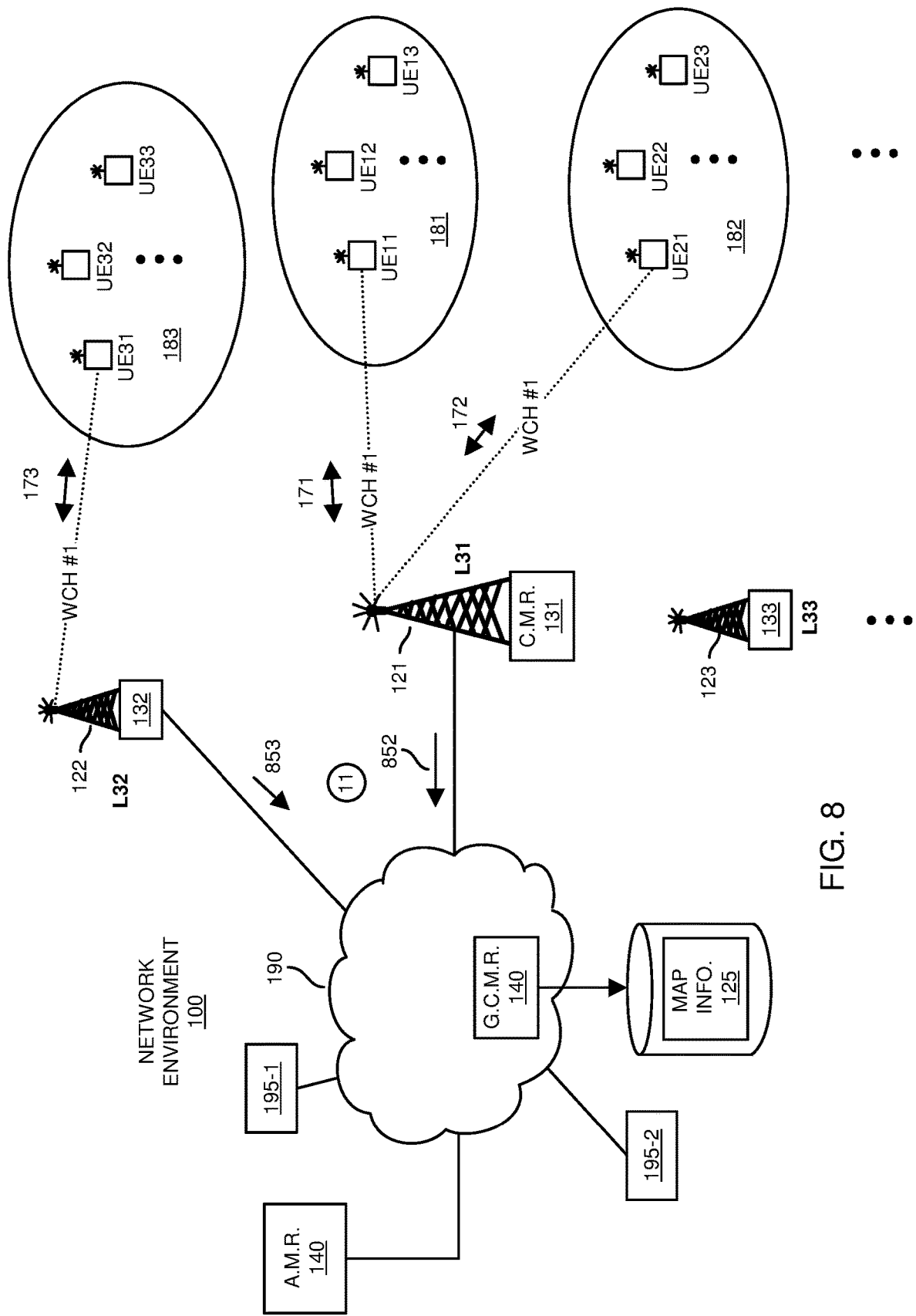
FIG. 8 is an example diagram illustrating reversion of operating the wireless network in a standard mode subsequent operating in the device-to-device mode according to embodiments herein.

FIG. 8 is an example diagram illustrating reversion of operating the wireless network in a standard communication mode again subsequent operating in the device-to-device mode according to embodiments herein.

Subsequent to operating in the device-to-device mode, the wireless base station 121 operates in a standard mode again in which the wireless base station 121 individually provides multiple communication devices access to network 190.

As further shown, the allocation management resource 140 continues to receive feedback (such as communications 852, communications 853, etc.) from each of the wireless base stations 121, 122, etc. Via the feedback, in a manner as previously discussed, the allocation management resource 140 determines occurrence of wireless interference. The allocation management resource 140 (or other suitable entity) in network environment 100 initiates switchover to the device-to-device mode in a manner as previously discussed in response to detecting occurrence of the wireless interference.

Figure 9:
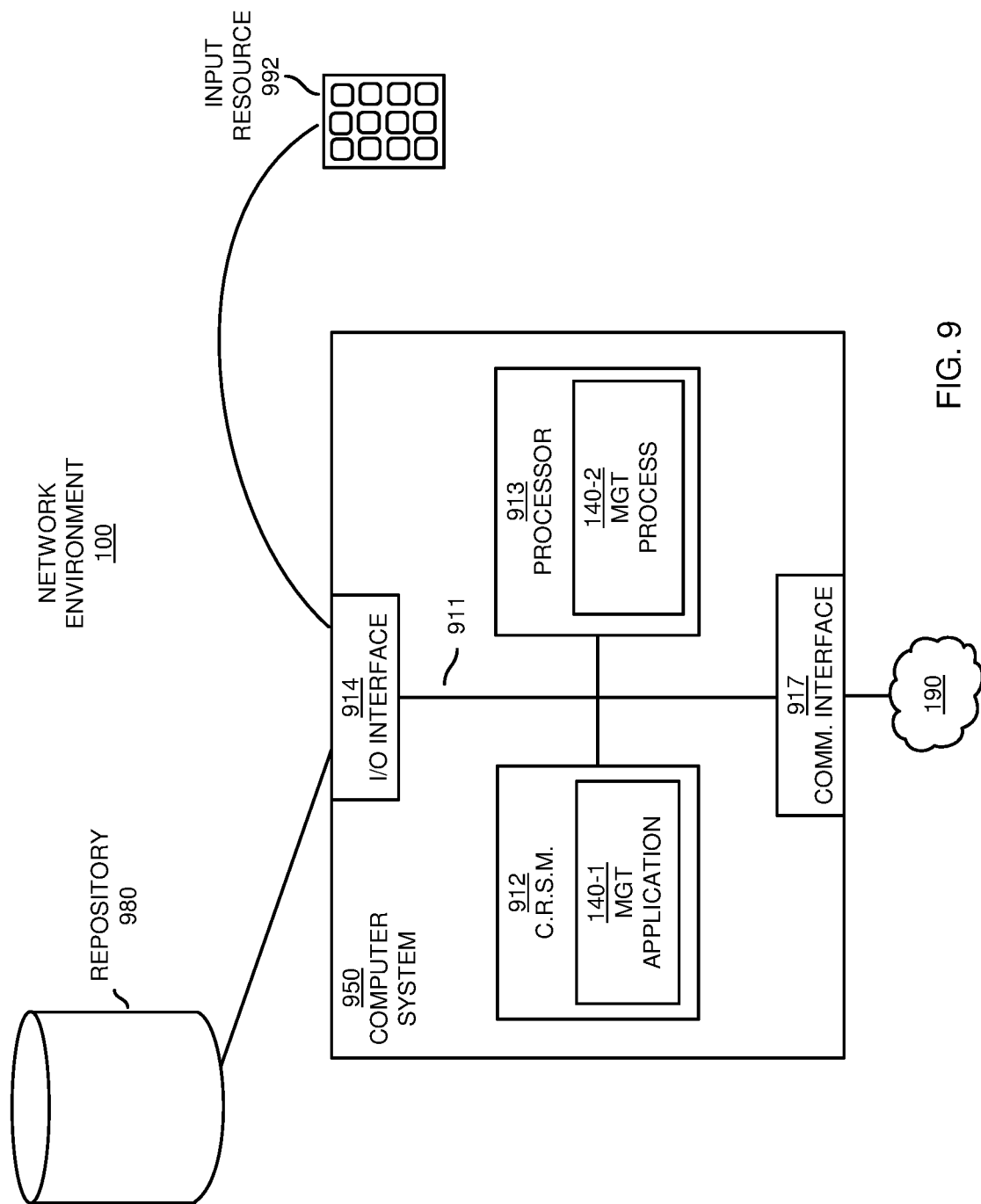
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as mobile communication devices, wireless access points, wireless stations, wireless base stations, communication management resource, bandwidth management resource, etc.) as discussed herein can be configured to include computer processor hardware and/or corresponding executable instructions to carry out the different operations as discussed herein.

As shown, computer system 950 of the present example includes an interconnect 911 that coupling computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage media 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
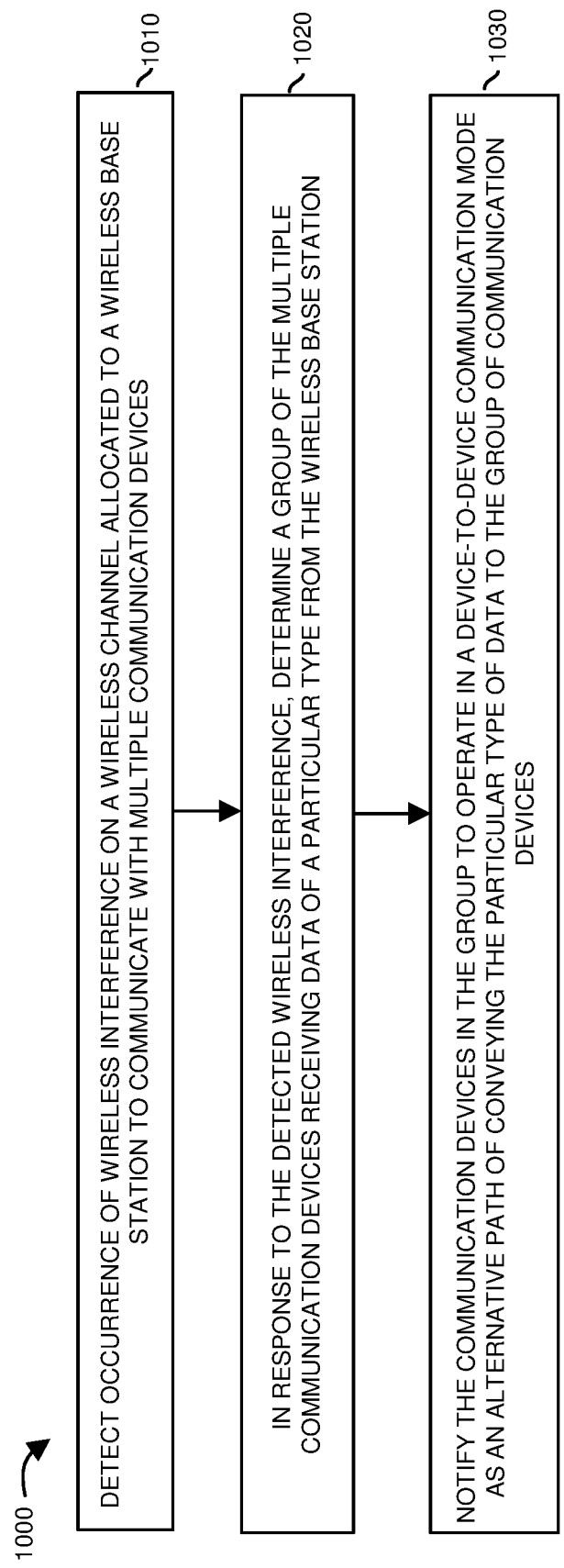
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the wireless base station 121 detects occurrence of wireless interference on a wireless channel allocated to a wireless base station to communicate with multiple communication devices.

In processing operation 1020, in response to the detected wireless interference, the wireless base station 121 determines a group of the multiple communication devices receiving data of a particular type from the wireless base station.

In processing operation 1030, the wireless base station notifies the communication devices in the group to operate in a device-to-device communication mode as an alternative path of conveying the particular type of data to the group of communication devices.

FURTHER EMBODIMENTS

In one embodiment, the wireless base station 121 is a so-called CBSD connects with an allocation management resource 140 such as a spectrum access system.

The allocation management resource 140 grants spectrum such as wireless channel WCH1 to the CBSD to communicate with one or more communication devices UE11, UE12, etc.

The gateway communication management resource 142 (such as a PGW) checks the type of traffic consumed by each CBSD and by each UE in the network together with the exact time such content is consumed (or conveyed through the network 190). In one embodiment, the gateway communication management resource 142 creates a lookup table of IP addresses to data traffic type requested or consumed by the communication devices. In one embodiment, each communication device is assigned a unique IP address by the allocation management resource 140 or other suitable entity.

The allocation management resource 140 or other suitable entity measures or determines occurrence of interference in the network environment 100. If the detected wireless interference is greater than a threshold value, the allocation management resource 140 (such as SAS) sends a power down message to each of one or more CBSDs (wireless base stations) that cause the wireless interference.

The wireless base station (CBSD) communicates a 'power down notification received' message to the gateway communication management resource 142 (such as PGW). The gateway communication management resource 142 check a lookup table to determine a type of data traffic requested for retrieval at that time.

If there is a match among the traffic types retrieved/consumed by communication devices (UEs) such as multiple communication devices retrieving the same data or content, then the next time a communication device requests that same type of data traffic, the gateway communication management resource 142 initiates activation of a device-to-device communication mode as discussed herein to facilitate conveyance of the data (content) through the network 190 and wireless base station 121 to the communication devices. For example, embodiments herein include communicating the requested data over a wireless communication link from the wireless base station 121 to a first communication device UE11. The communication device UE11 operates in a device-to-device mode, communicating the requested data over a respective device-to-device communication link between the communication device UE11 and the communication device UE13. Thus, embodiments herein include a PGW sending data traffic to a single UE, and that single UE caches the data, and then the communication device (UE) sends the cached data to one or more other UEs in the network.

Thus, when the device-to-device (such as D2D) mode of communications is enabled, one UE sends data to other UEs directly, alleviating the need for the wireless base station (CBSD) to send the same data to each of the communication devices. Any UE in the network can cache the traffic, and share with other UEs directly. The recipient UEs can utilize this data in real time at the time they receive, or they can also cache for future use.

When there is no longer wireless interference detected in the network environment, the wireless base station 121 communicates the requested data over individual wireless communication links between the wireless base station and each communication device.

Note again that techniques herein are well suited to facilitate communication in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   detecting occurrence of wireless interference on a wireless channel allocated to a wireless base station to communicate with multiple communication devices;
   in response to the detected wireless interference, determining a group of the multiple communication devices receiving first data of a particular type from the wireless base station; and
   via a notification, notifying the communication devices in the group to operate in a device-to-device communication mode, the device-to-device communication mode supporting conveyance of second data of the particular type to the group of communication devices.

2. The method as in claim 1 further comprising:
   communicating the second data of the particular type to a first communication device of the multiple communication devices, the first communication device operative to communicate the second data to a second communication device via the device-to-device communication mode, the second communication device being a first member of the group.

3. The method as in claim 1 further comprising:
   producing connection information indicating interconnectivity of the communication devices in the group with respect to a root communication device in communication with the wireless base station, the interconnectivity defining the device-to-device communication mode of conveying the second data of the particular type; and
   communicating the connection information to the communication devices in the group.

4. The method as in claim 3, wherein the detected occurrence is a first instance of the wireless interference, the method further comprising:
   notifying the communication devices in the group to implement the interconnectivity of the communication devices as indicated by the connection information in response to detecting a second instance of the wireless interference.

5. The method as in claim 1 further comprising:
   notifying the communication devices in the group to operate in the device-to-device communication mode for a specified duration of time.

6. The method as in claim 1, wherein each of the communication devices in the group receives a copy of the second data.

7. The method as in claim 1 further comprising:
   registering the wireless base station with an allocation management resource; and
   at the wireless base station, receiving allocation of the wireless channel from the allocation management resource.

8. The method as in claim 7 further comprising:
   at the wireless base station, receiving notification to discontinue use of the wireless channel.

9. The method as in claim 1 further comprising:
   monitoring communications transmitted to the multiple communication devices through the wireless base station; and
   based on the monitoring, detecting that each of the communication devices in the group receives the first data of the particular type.

10. The method as in claim 1 further comprising:
    designating a first communication device of the multiple communication devices to receive communications from the wireless base station, the first communication device operative to convey the communications to a second communication device in the group via the device-to-device communication mode.

11. The method as in claim 1 further comprising:
    producing timing information indicating a respective time duration in which the second data of the particular type communicated to each of the communication devices in the group.

12. The method as in claim 1, wherein the wireless channel is allocated from a CBRS (Citizens Band Radio Service) bandwidth.

13. The method as in claim 2, wherein the first communication device is further operative to communicate the second data to a third communication device via the device-to-device communication mode, the third communication device being a member of the group.

14. The method as in claim 1, wherein a first communication device of the multiple communication devices is operative to communicate the second data to a second communication device and a third communication device via the device-to-device communication mode, the second communication device being a first member of the group, the third communication device being a second member of the group.

15. The method as in claim 1 further comprising:
    notifying a first communication device of the multiple communication devices to operate as a root node;
    notifying a second device to operate in the device-to-device communication mode in which the second communication device receives communications from the first communication device, the second communication device being a first member of the group; and
    notifying a third device to operate in the device-to-device communication mode in which the third communication device receives communications from the first communication device, the third communication device being a second member of the group.

16. The method as in claim 15 further comprising:
    communicating the second data of the particular type to the first communication device, the first communication device wirelessly communicating a first copy of the second data to the second communication device, the first communication device wirelessly communicating a second copy of the second data to the third communication device.

17. The method as in claim 15 further comprising:
    communicating the second data from the wireless base station to the first communication device, the first communication device wirelessly communicating the second data to the second communication device and the third communication device via the allocated first wireless channel.

18. The method as in claim 1 further comprising:
controlling a power level at which a first communication device communicates the second data of the particular type to a second communication device and a third communication device, the second communication device and the third communication device being members of the group.

19. The method as in claim 1 further comprising:
detecting occurrence of the wireless interference on the wireless channel based on wireless communication of the first data of the particular type to communication devices in the group.

20. The method as in claim 1 further comprising:
detecting the occurrence of the wireless interference on the wireless channel based on wirelessly communicating: i) a first instance of the first data of the particular type from the wireless base station over a first wireless communication link to a first communication device via the wireless channel; and ii) a second instance of the first data of the particular type from the wireless base station over a second wireless communication link to a second communication device via the wireless channel.

21. The method as in claim 20 further comprising:
producing the group of communication devices to include the first communication device and the second communication device.

22. A system comprising:
communication management hardware operative to:
 detect occurrence of wireless interference on a wireless channel allocated to a wireless base station to communicate with multiple communication devices;
 in response to the detected wireless interference, determine a group of the multiple communication devices receiving first data of a particular type from the wireless base station; and
 notify the communication devices in the group to operate in a device-to-device communication mode, the device-to-device communication mode supporting conveyance of second data of the particular type to the group of communication devices.

23. The system as in claim 22, wherein the communication management hardware is further operative to:
communicate the second data of the particular type to a first communication device of the multiple communication devices, the first communication device operative to communicate the second data to a second communication device via the device-to-device communication mode, the second communication device being a first member of the group.

24. The system as in claim 22, wherein the communication management hardware is further operative to:
produce connection information indicating interconnectivity of the communication devices in the group, the interconnectivity defining the device-to-device communication mode of conveying the second data of the particular type; and
communicate the connection information to the communication devices in the group.

25. The system as in claim 24, wherein the detected occurrence is a first instance of the wireless interference, the communication management hardware being further operative to:

notify the communication devices in the group to implement the interconnectivity as indicated by the connection information in response to detecting a second instance of the wireless interference.

26. The system as in claim 22, wherein the communication management hardware is further operative to:
notify the communication devices in the group to operate in the device to device communication mode for a specified duration of time.

27. The system as in claim 22, wherein each of the communication devices in the group receives a copy of the second data.

28. The system as in claim 22, wherein the communication management hardware is further operative to:
register the wireless base station with an allocation management resource; and
at the wireless base station, receive allocation of the wireless channel from the allocation management resource.

29. The system as in claim 28, wherein the communication management hardware is further operative to:
receive notification to discontinue use of the wireless channel.

30. The system as in claim 22, wherein the communication management hardware is further operative to:
monitor communications transmitted to the multiple communication devices through the wireless base station; and
based on the monitoring, detect that each of the communication devices in the group receives the first data of the particular type.

31. The system as in claim 22, wherein the communication management hardware is further operative to:
designate a first communication device of the multiple communication devices to receive communications from the wireless base station, the first communication device operative to convey the communications to a second communication device in the group via the device-to-device communication mode.

32. The system as in claim 22, wherein the communication management hardware is further operative to:
produce timing information indicating a respective time duration in which the second data of the particular type is communicated to each of the communication devices in the group.

33. The system as in claim 22, wherein the wireless channel is allocated from a CBRS (Citizens Band Radio Service) bandwidth.

34. A method comprising:
detecting occurrence of wireless interference on a wireless channel allocated to a wireless base station to communicate with multiple communication devices;
in response to the detected wireless interference, determining a group of the multiple communication devices receiving data of a particular type from the wireless base station; and
notifying the communication devices in the group to operate in a device-to-device communication mode to convey the particular type of data to the group of communication devices.

* * * * *

UNITED STATES PATENT AND TRADEMARK OFFICE
CERTIFICATE OF CORRECTION

PATENT NO. : 11,589,364 B2
APPLICATION NO. : 17/159296
DATED : February 21, 2023
INVENTOR(S) : Volkan Sevindik and Haider H. Syed It is certified that error appears in the above-identified patent and that said Letters Patent is hereby corrected as shown below:

In the Claims

Claim 11, Line 4, change "communicated" to --is communicated--

Signed and Sealed this
Twenty-eighth Day of March, 2023

Katherine Kelly Vidal
*Director of the United States Patent and Trademark Office*